Aug. 2, 1932.  J. W. SHARPE  1,870,146
AUTOMATIC BRAKE
Filed Feb. 3, 1930   2 Sheets-Sheet 2
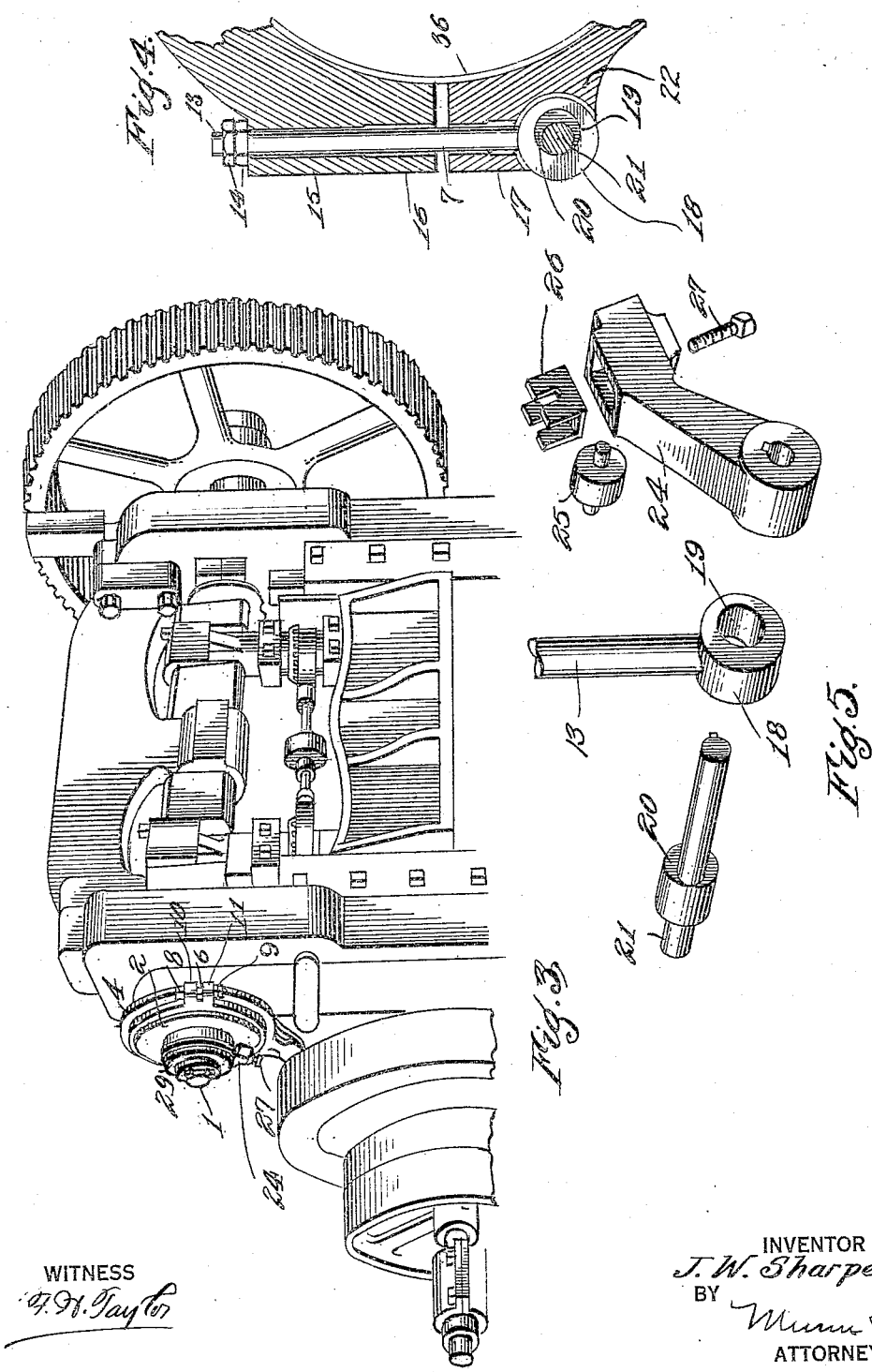
WITNESS
F. H. Taylor
INVENTOR
J. W. Sharpe
BY
Munn & Co
ATTORNEY Patented Aug. 2, 1932

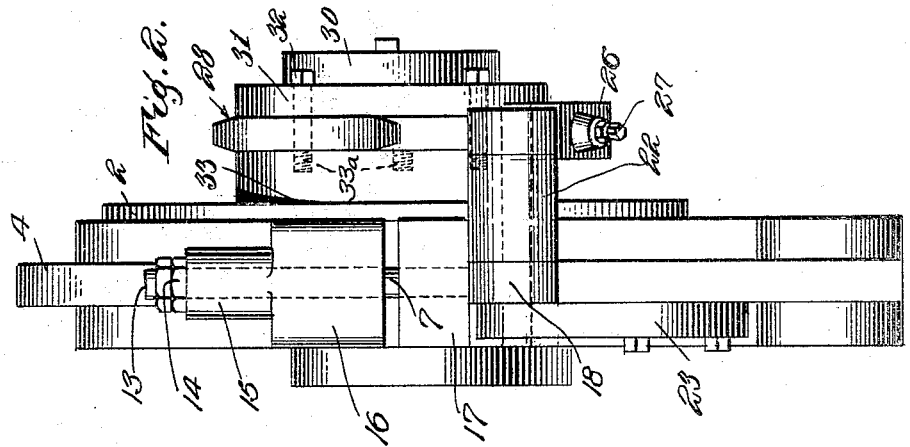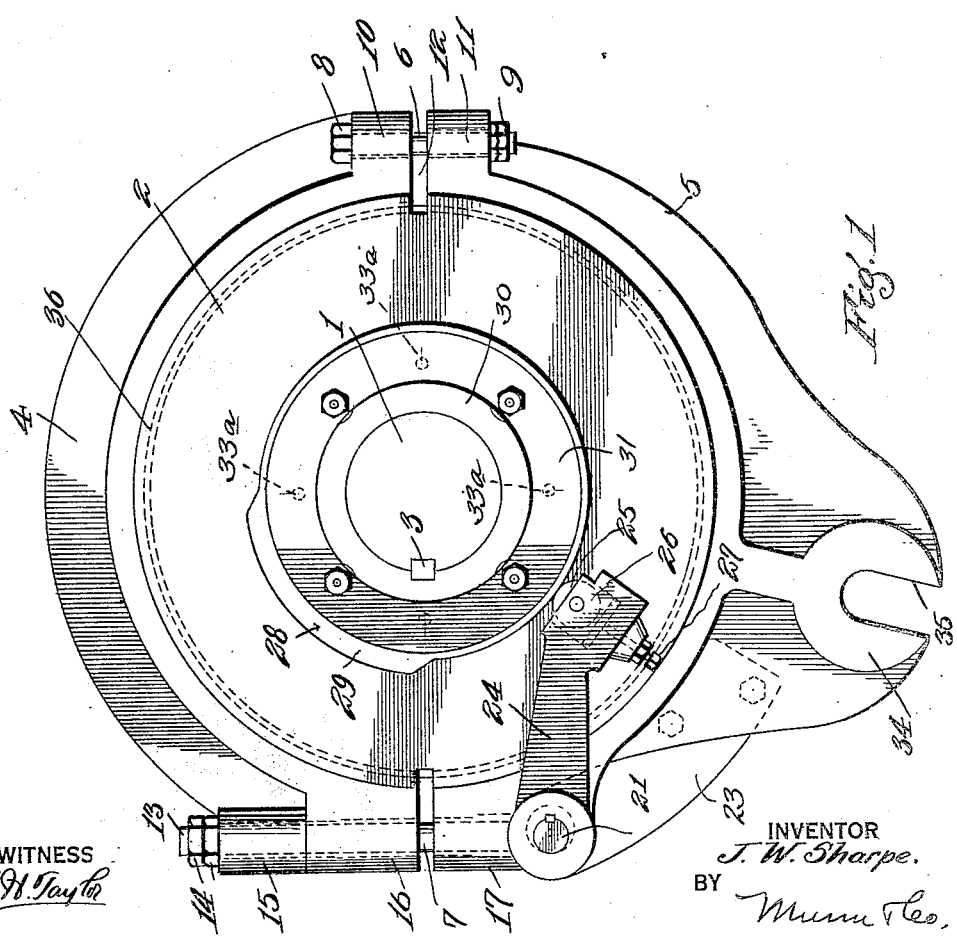

1,870,146

UNITED STATES PATENT OFFICE

JOSEPH W. SHARPE, OF ST. LOUIS, MISSOURI

AUTOMATIC BRAKE

Application filed February 3, 1930. Serial No. 425,579.

My invention relates to automatic brakes adapted for application to shafts of any nature requiring retardation at any specific point of the revolution, more particularly for use on the crank shafts of power stamping presses, power shears, and the like, and it consists in the combinations, constructions, and arrangements herein shown and described.
As is well known to those engaged in the drawing of sheet metal articles on stamping or punching presses the rebound of the spring used in combination dies and usually mounted on the bolster plate causes rapid wear and tear on the tools as well as the press. If an ordinary brake is applied to the crank shaft to overcome this rebound, said brake is operative upon the down stroke as well as the up stroke and consequently results in a loss of power during said down stroke. It is therefore a primary object of my invention to provide an automatic brake which will hold the rebound and allow it to recoil only in regular progression upward of the slide and not to exceed the speed of the same and which does not become effective on the shaft reciprocating the slide until all of the work is done and the slide is on the bottom of the stroke.
It is a further object of my invention to provide a brake of the type described which by proper proportioning of the parts may be adapted to perform its braking action on a shaft at any desired point in the revolution and throughout any desired arc of movement of said revolution.

A further object of my invention is to provide a brake of the type described which by simple adjustments may be readily positioned to perform the braking action at the point of the revolution desired.

A still further object of my invention is to provide a device of the character described which is readily applicable to shafts of any nature more particularly to shafts of power presses and the like of conventional construction with very little modification of said shafts.

A further object of my invention is to provide a device of the character described which has few parts, is simple to manufacture and does not get out of order easily.

Other objects and advantages will appear as the specification proceeds and the invention will be more particularly defined in the appended claims.

My device is illustrated in the accompanying drawings forming a part of this application, in which:

Figure 1 is a front elevational view of my device,

Figure 2 is a side elevational view of my device,

Figure 3 is a perspective view of a stamping and punching press equipped with my device, Figure 4 is a sectional detail view of a portion of the device, and Figure 5 is a detail assembly view of portions of the device.

In applying my invention to a shaft 1, whose motion it is desired to retard at certain predetermined points throughout its revolution I make use of an ordinary brake disc 2 having a hub 30, which I affix to the shaft 1 by any suitable means such as the key and co-operating keyway, generally indicated at 3.

For engagement with said brake disc at predetermined intervals as will be hereinafter described, to retard the rotation of the shaft 1, brake bands 4 and 5 are provided. As appears most clearly in Figure 1 these brake bands are normally in spaced relation relative to one another and relative to the periphery of the brake disc 2. The bolt fastening means, generally indicated at 6 and 7, provide a lost motion connection for these bands.

The connection, generally indicated at 6, comprises a simple bolt 8 and co-operating nut 9, the bolt being engageable through projecting shoulders 10 and 11 provided on the brake bands 4 and 5, respectively. The shoulders 10 and 11 are in spaced relation as appears at 12 allowing clearance for drawing the bands together to grip the brake-disc 2 in a well known manner.

The fastening means 7 for the brake bands 4 and 5 comprises an elongated bolt member 13 having a pair of lock nuts 14 positioned at the top thereof adapted for engagement with a projecting boss 15 provided on one of the brake band members, in this case shown as provided on member 4. As in the case of the fastening means shown at 6 this bolt 13 extends through the boss 15 and the projecting shoulders 16 and 17 on the brake bands 4 and 5, respectively. The lower end of this bolt 13 projects below the shoulder 17 on the brake band 5 and is provided with an enlarged cylindrical end 18 having a transverse bore 19 therein, said transverse bore being eccentrically positioned relative to the axis of the bolt 13, for a purpose soon to be described.

This bolt 13 is raised and lowered by means engageable through the bore and actuated in synchronism with the rotation of the shaft for drawing the bands 4 and 5 together to retard the rotation of the shaft 1 at desired intervals throughout the rotation. This is accomplished by engaging through said bore 19 an eccentric enlargement 20 cylindrical in shape and positioned for rotation on a pin 21. This pin 21 is mounted for rotation in a boss 22 integral with the brake band member 5 and the casting 23 which is removably positioned upon said member 5 to facilitate assembly.

For oscillating this pin about its axis to move the enlargement 20 about said axis and to consequently raise and lower the bolt 13 relative to the band member 5, the lever 24, shown in Fig. 1 and more clearly in Fig. 5, is keyed or otherwise suitably secured to the pin 21. The end of this lever 24 has mounted thereon an anti-friction follower 25 adjustably related to said lever by the adjustably positioned mounting box 26 therefor, having the adjusting screw 27 for varying the position of said mounting box to said lever.

This follower is actuated to oscillate the lever 24 about the axis of the pin 21 by a cam 28 having a cam lobe 29 thereon for engagement with said follower. This cam has an extending hub or boss 30 about which a collar 31, which I call the adjusting collar, is positioned. This collar 31 has bolt holes therethrough for reception of the bolts 32 engageable through said collar, the cam 28 and with hub 33 of the brake disc 2. Suitable bolt holes 33ª are provided in the hub 33 for the reception of said bolts in the various adjustable positions. It is obvious from this description that the cam 28 may be rotated relative to the hub 33 and consequently relative to the shaft 1 and secured in position by the clamping ring 31 to position the cam for operation of the brake at any desired point of the revolution of the shaft 1 as desired.

To further facilitate adjustment of the device the brake band member 5 is provided with a projecting bill 34 having a mouth 35 for engagement with a bolt or other suitable fastening means which is fixed relative to the shaft 1. This bolt may be engaged with any stationary part of the machine to which the brake is applied to secure this fixed relation. It is also obvious that said bolt may be applied in any position about said shaft circumferentially throughout 360°.

From the foregoing description the operation of my device is easily understood. The brake disc is keyed on the shaft or otherwise suitably attached thereto for rotation therewith and the cam is fixed in the desired adjusted position. The brake bands are then positioned about the disc and a suitable brake lining 36 applied therebetween. The brake band member 5 is secured against rotation by engagement of the mouth 35 of the bill 34 with any suitable fastening means as heretofore set forth.

The parts are adjusted to render the brake bands operative upon the brake disc at the predetermined points of the revolution of the shaft at which accelerational forces tend to increase the speed of rotation thereof. At these points the cam 28 will engage the follower 25, depressing the lever 24 and rotating the enlarged eccentrically positioned cylindrical portion 20 of the pin 21 with consequent lowering of the bolt 13 and actuation of the brake bands 4 and 5 into close locked engagement with the brake disc 2. Upon the passage of the lobe 29 of the cam 28 beyond these predetermined points the follower will be elevated, thereby elevating the bolt 13 relative to the brake band member 5 with a consequent release of the braking pressure of said brake members on the brake disc. The adjustably-positioned cam and associated adjustable follower permit the device to be positioned to secure the function of the brake at any desired interval of the rotation. The means for securing the brake member 5 in fixed relation also permits a fine adjustment of the relationship between the shaft 1 and the braking device. It is thus seen that I have provided an automatic brake which is applicable to an ordinary rotary shaft of any nature whose speed it is desired to retard during a portion of the revolution thereof, and which is easily adjusted to perform the operation at any desired point throughout the revolution of the shaft.

I claim:

1. In an automatic brake for use on rotary shafts, a brake disc, brake bands surrounding said brake disc, bolt means connecting said brake bands in normally spaced relation relative to one another and to said brake disc, means for securing said brake bands against rotation, and means for actuating said brake bands into engagement with said brake disc to retard said shaft at predetermined points of rotation, comprising an enlarged boss integral with one of said bolts and having a bore, an eccentric engageable through said bore, and means for rotating said eccentric to raise and lower said bolt.

2. An automatic brake for use on rotary shafts, comprising a brake disc fixedly secured on said rotary shaft, brake bands positioned about said brake disc in spaced relation to said shaft, fastening means connecting said bands, and means for moving said fastening means to draw together said bands consisting of an eccentric engageable through said bore, a lever fixedly related to said eccentric, and a cam mounted on said shaft for engagement with said follower for rotation of said eccentric, said cam being adjustably positioned on the rotatable shaft.

3. In an automatic brake for use on rotary shafts, a brake disc positioned on the rotary shaft, brake bands positioned about said brake disc, fastening means for drawing said brake bands together to engage said brake disc, and means for actuating said fastening means comprising an eccentric engageable therewith, a lever co-operating with said eccentric, and a cam positioned on said shaft for the operation of said lever.

4. In an automatic brake for use on rotary shafts, brake means for retarding the rotation of said shaft at predetermined intervals, fastening means adapted to operate said brake, cam follower means for operating said fastening means, and a cam on the shaft for oscillating said cam follower means, said cam follower being radially adjustable relative to said cam, and said cam being circumferentially adjustable relative to said cam follower.

JOSEPH W. SHARPE.